(12) United States Patent
Condie et al.

(10) Patent No.: US 12,065,540 B2
(45) Date of Patent: Aug. 20, 2024

(54) THIOL-CONTAINING COMPOSITION

(71) Applicant: PPG Industries Ohio, Inc., Cleveland, OH (US)

(72) Inventors: Allison G. Condie, Valencia, PA (US); Maria S. French, Maidenhead (GB); Masayuki Nakajima, Wexford, PA (US); Hongying Zhou, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 424 days.

(21) Appl. No.: 17/278,062

(22) PCT Filed: Sep. 20, 2019

(86) PCT No.: PCT/US2019/052123
§ 371 (c)(1),
(2) Date: Mar. 19, 2021

(87) PCT Pub. No.: WO2020/061436
PCT Pub. Date: Mar. 26, 2020

(65) Prior Publication Data
US 2022/0127448 A1    Apr. 28, 2022

Related U.S. Application Data

(60) Provisional application No. 62/733,816, filed on Sep. 20, 2018.

(51) Int. Cl.
*C08L 63/00* (2006.01)
*B29C 64/118* (2017.01)
(Continued)

(52) U.S. Cl.
CPC ............ *C08G 63/664* (2013.01); *B33Y 70/00* (2014.12); *C08G 59/066* (2013.01); *C08G 59/56* (2013.01); *C08G 59/66* (2013.01); *C08G 63/78* (2013.01); *C08L 63/00* (2013.01); *C08L 81/02* (2013.01); *C09D 7/63* (2018.01); *C09D 163/00* (2013.01); *C09D 167/04* (2013.01); *C09J 11/06* (2013.01); *C09J 163/00* (2013.01); *C09J 167/04* (2013.01); *G10K 11/162* (2013.01); *B29C 64/118* (2017.08); *B29K 2063/00* (2013.01);
(Continued)

(58) Field of Classification Search
CPC ..................................................... C08G 59/56
See application file for complete search history.

(56) References Cited

U.S. PATENT DOCUMENTS 4,793,867 A    12/1988  Charles et al.
5,430,112 A    7/1995   Sakata et al.
(Continued)

FOREIGN PATENT DOCUMENTS

JP    2009-167251 A2    7/2009
WO    2014/100245 A2    6/2014
(Continued)

*Primary Examiner* — Ian A Rummel
(74) *Attorney, Agent, or Firm* — Alicia M. Passerin; Ashley N. Crane

(57) ABSTRACT

The present invention is directed toward a composition comprising: an epoxy compound, a polythiol curing agent, and a second curing agent. Also disclosed are methods of treating a substrate with the composition and substrates formed by such methods.

21 Claims, 4 Drawing Sheets

(51) Int. Cl.
  *B33Y 10/00* (2015.01)
  *B33Y 70/00* (2020.01)
  *C08G 59/06* (2006.01)
  *C08G 59/56* (2006.01)
  *C08G 59/66* (2006.01)
  *C08G 63/664* (2006.01)
  *C08G 63/78* (2006.01)
  *C08L 81/02* (2006.01)
  *C09D 7/63* (2018.01)
  *C09D 163/00* (2006.01)
  *C09D 167/04* (2006.01)
  *C09J 11/06* (2006.01)
  *C09J 163/00* (2006.01)
  *C09J 167/04* (2006.01)
  *G10K 11/162* (2006.01)
  *B29K 63/00* (2006.01)

(52) U.S. Cl.
  CPC ....... *B29K 2995/0002* (2013.01); *B33Y 10/00* (2014.12); *C08L 2205/035* (2013.01)

(56) References Cited

U.S. PATENT DOCUMENTS

| | | | |
|---|---|---|---|
| 5,588,989 A | 12/1996 | Vonk et al. | |
| 6,172,179 B1 | 1/2001 | Zook et al. | |
| 6,913,798 B2 | 7/2005 | Kitamura et al. | |
| 7,541,075 B2 | 6/2009 | Kitamura et al. | |
| 7,749,368 B2 | 7/2010 | McMurdie et al. | |
| 8,673,091 B2 | 3/2014 | McMillen et al. | |
| 8,976,361 B2 | 3/2015 | Kato | |
| 9,315,698 B2 | 4/2016 | Zaffaroni et al. | |
| 9,562,175 B2 | 2/2017 | Asay et al. | |
| 2005/0143496 A1 | 6/2005 | Mueller | |
| 2012/0129980 A1 | 5/2012 | Desai et al. | |
| 2013/0023603 A1 | 1/2013 | Walter et al. | |
| 2013/0267136 A1 | 10/2013 | Salnikov et al. | |
| 2015/0165670 A1 | 6/2015 | Hebert et al. | |
| 2016/0137839 A1* | 5/2016 | Rolland | G03F 7/00 522/71 |
| 2017/0166687 A1 | 6/2017 | Ortelt et al. | |
| 2021/0355272 A1 | 11/2021 | Condie et al. | |

FOREIGN PATENT DOCUMENTS

| | | |
|---|---|---|
| WO | WO2014100245 A2 | 6/2014 |
| WO | 2016/176548 A1 | 11/2016 |
| WO | WO2016176548 A1 | 11/2016 |
| WO | 2019/060559 A1 | 3/2019 |
| WO | 2019060513 A1 | 3/2019 |
| WO | WO2019060559 A1 | 3/2019 |
| WO | 2020191202 A1 | 9/2020 |

* cited by examiner

THIOL-CONTAINING COMPOSITION

CROSS-REFERENCE TO RELATED APPLICATION

This application claims priority to U.S. Provisional Patent Application No. 62/733,816, filed on Sep. 20, 2018, which is incorporated herein by reference.

FIELD OF THE INVENTION

The present invention relates to thiol-containing compositions and more particularly to sealant and coating compositions.

BACKGROUND OF THE INVENTION

Coating compositions, including sealants, are utilized in a wide variety of applications to treat a variety of substrates or to bond together two or more substrate materials.

SUMMARY OF THE INVENTION

Disclosed is a composition comprising: a polythiol curing agent; a first component comprising an epoxy-containing compound; and a second component comprising a second curing agent that reacts with the polythiol curing agent in the absence of an external energy source; wherein the polythiol curing agent may be in the first component and/or the second component; and wherein the epoxy-containing compound has an epoxide equivalent weight of more than 350 g/eq and the polythiol curing agent has a polythiol equivalent weight of no more than 600 g/eq or the epoxy-containing compound has an epoxide equivalent weight of no more than 350 g/eq and the polythiol curing agent has a polythiol equivalent weight of more than 600 g/eq.

Also disclosed are methods for treating a substrate with one of the compositions disclosed herein.

Also disclosed are substrates comprising a surface at least partially coated with a layer formed from one of the compositions disclosed herein.

Also disclosed are vehicles comprising one of the substrates disclosed herein.

DETAILED DESCRIPTION OF THE INVENTION

Figure 1:
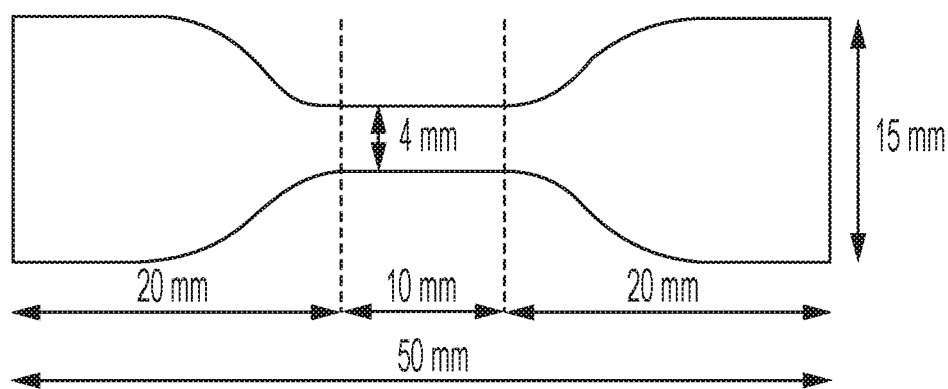
FIG. 1 is a schematic of the dog bone samples.

For purposes of the following detailed description, it is to be understood that the invention may assume various alternative variations and step sequences, except where expressly specified to the contrary. Moreover, other than in any operating examples, or where otherwise indicated, all numbers such as those expressing values, amounts, percentages, ranges, subranges and fractions may be read as if prefaced by the word "about," even if the term does not expressly appear. Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Where a closed or open-ended numerical range is described herein, all numbers, values, amounts, percentages, subranges and fractions within or encompassed by the numerical range are to be considered as being specifically included in and belonging to the original disclosure of this application as if these numbers, values, amounts, percentages, subranges and fractions had been explicitly written out in their entirety.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used herein, "including," "containing" and like terms are understood in the context of this application to be synonymous with "comprising" and are therefore open-ended and do not exclude the presence of additional undescribed or unrecited elements, materials, ingredients or method steps. As used herein, "consisting of" is understood in the context of this application to exclude the presence of any unspecified element, ingredient or method step. As used herein, "consisting essentially of" is understood in the context of this application to include the specified elements, materials, ingredients or method steps "and those that do not materially affect the basic and novel characteristic(s)" of what is being described.

As used herein, unless indicated otherwise, a plural term can encompass its singular counterpart and vice versa, unless indicated otherwise. For example, although reference is made herein to "a" polythiol curing agent, "an" epoxy-containing compound and "a" filler material, a combination (i.e., a plurality) of these components can be used.

In addition, in this application, the use of "or" means "and/or" unless specifically stated otherwise, even though "and/or" may be explicitly used in certain instances.

As used herein, the terms "on," "onto," "applied on," "applied onto," "formed on," "deposited on," "deposited onto," mean formed, overlaid, deposited, or provided on but not necessarily in contact with the surface. For example, a coating composition "applied onto" a substrate does not preclude the presence of one or more other intervening coating layers of the same or different composition located between the coating composition and the substrate.

As used herein, a "coating composition" refers to a composition that, in an at least partially dried or cured state, is capable of producing a film, layer, or the like on at least a portion of a substrate surface.

As used herein, a "sealant composition" refers to a coating composition that, in an at least partially dried or cured state, has an elongation of at least 50% and/or at least 1 MPa load at failure as determined according to measured according to ASTM D-412 with a pull rate of 50 mm/min and a sample configuration as shown in FIG. 1 and has the ability to resist atmospheric conditions, such as moisture and temperature and at least partially block the transmission of materials, such as water, fuel, and other liquids and gasses.

As further defined herein, ambient conditions generally refer to room temperature and humidity conditions or temperature and humidity conditions that are typically found in the area in which the composition is applied to a substrate, e.g., at 20° C. to 40° C. and 20% to 80% relative humidity, while slightly thermal conditions are temperatures that are slightly above ambient temperature but are generally below the curing temperature for the composition (i.e., in other words, at temperatures and humidity conditions below which the reactive components will readily react and cure, e.g., >40° C. and less than 100° C. at 20% to 80% relative humidity.

As used herein, the term "two component" or "2K" refers to a composition in which at least a portion of the reactive components readily react and at least partially cure without activation from an external energy source, such as at ambient or slightly thermal conditions, when mixed. One of skill in the art understands that the two components of the composition are stored separately from each other and mixed just prior to application of the composition. Two-component compositions may optionally be heated or baked, as described below.

As used herein, the term "cure" or "curing", means that the components that form the composition are crosslinked to form a film, layer, or bond. As used herein, the term "at least partially cured" means that at least a portion of the components that form the composition are crosslinked to form a film, layer, or bond. In the case of a 2K composition, the composition is at least partially cured or cured when the components of the composition are mixed to lead to the reaction of the reactive functional groups of the components of the composition.

As used herein, the term "catalyst" means a substance that increases the rate or decreases the activation energy of a chemical reaction without itself undergoing any permanent chemical change.

As used herein, the term "curing agent" means any reactive material that can be added to a composition to accelerate curing of the composition (e.g., curing of a polymer). The term "reactive" when used with respect to the curing agent means capable of chemical reactions and includes any level of reaction from partial to complete reaction of a reactant. In some examples, a curing agent may function as a reactive catalyst by decreasing the activation energy of a chemical reaction or may be reactive when it is consumed during cross-linking or gelling of a polymer.

As used herein, a "polythiol curing agent" refers to a chemical compound having at least two thiol functional groups (—SH) that may be used to "cure" a composition of the present invention a by reacting with the epoxide functional group of the epoxy-containing compound to form a polymeric matrix.

As used herein, the "epoxide equivalent weight" is determined by dividing the theoretical molecular weight of the epoxy-containing compound by the number of epoxide groups present in the epoxy-containing compound. In the case of oligomeric or polymeric epoxy compounds, the epoxide equivalent weight is determined by dividing the average molecular weight of the epoxy compound by the average number of epoxide groups present in the molecules. Epoxy equivalent weight can also be determined by titration of a sample using a Metrohm 808 or 888 Titrando, wherein the mass of an epoxy-containing material used is 0.06 g per 100 g/eq of predicted epoxy equivalent weight. The sample is dissolved in 20 mL of methylene chloride (additional solvent can be used to ensure complete solvation; methanol or tetrahydrofuran may be used as co-solvents) then 40 mL glacial acetic acid is added. One gram of tetraethylammonium bromide is added to the solution before titration with 0.1 N perchloric acid.

As used herein, the "thiol equivalent weight" is determined by dividing the theoretical molecular weight of the polythiol curing agent by the number of thiol groups present in the polythiol curing agent. In the case of oligomeric or polymeric thiol compounds, the thiol equivalent weight is determined by dividing the average molecular weight of the thiol compound by the average number of thiol groups present in the molecules. Alternatively, the thiol equivalent can be determined by titration with silver nitrate using a Metrohm 808 Titrando, wherein the mass of a polythiol material used is 0.05 g per 100 g/eq of predicted thiol equivalent weight. The polythiol is dissolved in 30 mL pyridine and 50 mL tetrahydrofuran (additional solvent may be used to ensure complete solvation). The thiol solution is titrated with 0.1 N silver nitrate.

As used herein, "Mw" refers to the weight average molecular weight and means the value determined by Gel Permeation Chromatography using Waters 2695 separation module with a Waters 410 differential refractometer (RI detector) and polystyrene standards. Tetrahydrofuran (THF) used as the eluent at a flow rate of 1 ml min$^{-1}$, and two PL Gel Mixed C columns used for separation.

As used herein, unless indicated otherwise, the term "substantially free" means that a particular material is not purposefully added to a mixture or composition, respectively, and is only present as an impurity in a trace amount of less than 5% by weight based on a total weight of the mixture or composition, respectively. As used herein, unless indicated otherwise, the term "essentially free" means that a particular material is only present in an amount of less than 2% by weight based on a total weight of the mixture or composition, respectively. As used herein, unless indicated otherwise, the term "completely free" means that a mixture or composition, respectively, does not comprise a particular material, i.e., the mixture or composition comprises 0% by weight of such material.

As used herein, the term "glass transition temperature" ("Tg") refers to the temperature at which an amorphous material, such as glass or a polymer, changes from a brittle vitreous state to a plastic state or from a plastic state to a brittle vitreous state.

The present invention is directed to a composition comprising, or consisting essentially of, or consisting of, an epoxy compound, a polythiol curing agent, and a second curing agent, wherein the equivalent weight ratio of epoxide groups to thiol groups may be 50:1 to 1:50, such as 25:1 to 1:28, such as 10:1 to 1:30, such as 4:1 to 1:12. The equivalent weight ration of epoxide groups to thiol groups may be at least 1:50, such as at least 1:30, such as at least 1:28, such as at least 1:12, and may be no more than 50:1, such as no more than 25:1, such as no more than 10:1, such as no more than 4:1. The composition may be a 2K composition and may be a coating composition, such as a sealant composition.

In an example, the composition may comprise, or may consist essentially of, or may consist of: a polythiol curing agent; a first component comprising an epoxy-containing compound; and a second component comprising a second curing agent that reacts with the polythiol curing agent in the absence of an external energy source; wherein the polythiol curing agent may be in the first component and/or the second component; and wherein the epoxy-containing compound has an epoxide equivalent weight of more than 350 g/eq and the polythiol curing agent has a polythiol equivalent weight of no more than 600 g/eq or the epoxy-containing compound has an epoxide equivalent weight of no more than 350 g/eq and the polythiol curing agent has a polythiol equivalent weight of more than 600 g/eq.

The first component of the composition may comprise, or consist essentially of, or consist of, an epoxy-containing compound.

Suitable epoxy-containing compounds that may be used in the compositions disclosed herein may comprise polyepoxides (having an epoxide functionality greater than 1), epoxy adducts, or combinations thereof. Suitable polyepoxides include polyglycidyl ethers of Bisphenol A, such as Epon® 828 and 1001 epoxy resins, and Bisphenol F polyepoxides, such as Epon® 862, which are commercially available from Hexion Specialty Chemicals, Inc. Other suitable polyepoxides include polyglycidyl ethers of polyhydric alcohols, polyglycidyl esters of polycarboxylic acids, polyepoxides that are derived from the epoxidation of an olefinically unsaturated alicyclic compound, polyepoxides that are derived from the epoxidation of an olefinically unsaturated nonaromatic cyclic compound, polyepoxides containing oxyalkylene groups in the epoxy molecule, and epoxy novolac resins. Still other suitable epoxy-containing compounds include epoxidized Bisphenol A novolacs, epoxidized phenolic novolacs, epoxidized cresylic novolac, and triglycidyl p-aminophenol bismaleimide. The epoxy-containing compound may also comprise an epoxy-dimer acid adduct. The epoxy-dimer acid adduct may be formed as the reaction product of reactants comprising a diepoxide compound (such as a polyglycidyl ether of Bisphenol A) and a dimer acid (such as a C36 dimer acid), isosorbide diglycidyl ether, triglycidyl p-aminophenol, and triglycidyl p-aminophenol bismaleimide, triglycidyl isocyanurate, tetraglycidyl 4,4'-diaminophenylmethane, and tetraglycidyl 4,4'-diaminophenylsulphone. The epoxy-containing compound may also comprise a carboxyl-terminated butadiene-acrylonitrile copolymer modified epoxy-containing compound. The epoxy-containing compound may also comprise an epoxy-containing acrylic, such as glycidyl methacrylate.

The epoxy-containing compound may comprise an epoxy-adduct. The composition may comprise one or more epoxy-adducts. As used herein, the term "epoxy-adduct" refers to a reaction product comprising the residue of an epoxy compound and at least one other compound that does not include an epoxide functional group. For example, the epoxy-adduct may comprise the reaction product of reactants comprising: (1) an epoxy compound, a polyol, and an anhydride; (2) an epoxy compound, a polyol, and a diacid; or (3) an epoxy compound, a polyol, an anhydride, and a diacid.

The epoxy compound used to form the epoxy-adduct may comprise any of the epoxy-containing compounds listed above that may be included in the composition.

The polyol used to form the epoxy-adduct may include diols, triols, tetraols and higher functional polyols. Combinations of such polyols may also be used. The polyols may be based on a polyether chain derived from ethylene glycol, propylene glycol, butylene glycol, hexylene glycol and the like as well as mixtures thereof. The polyol may also be based on a polyester chain derived from ring opening polymerization of caprolactone (referred to as polycaprolactone-based polyols hereinafter). Suitable polyols may also include polyether polyols, polyurethane polyols, polyurea polyols, acrylic polyols, polyester polyols, polybutadiene polyols, hydrogenated polybutadiene polyols, polycarbonate polyols, polysiloxane polyols, and combinations thereof. Polyamines corresponding to polyols may also be used, and in this case, amides instead of carboxylic esters will be formed with the diacids and anhydrides.

The polyol may comprise a polycaprolactone-based polyol. The polycaprolactone-based polyols may comprise diols, triols or tetraols terminated with primary hydroxyl groups. Commercially available polycaprolactone-based polyols include those sold under the trade name Capa™ from Perstorp Group, such as, for example, Capa 2054, Capa 2077A, Capa 2085, Capa 2205, Capa 3031, Capa 3050, Capa 3091 and Capa 4101.

The polyol may comprise a polytetrahydrofuran-based polyol. The polytetrahydrofuran-based polyols may comprise diols, triols or tetraols terminated with primary hydroxyl groups. Commercially available polytetrahydrofuran-based polyols include those sold under the trade name Terathane®, such as Terathane® PTMEG 250 and Terathane® PTMEG 650 which are blends of linear diols in which the hydroxyl groups are separated by repeating tetramethylene ether groups, available from Invista. In addition, polyols based on dimer diols sold under the trade names Pripol®, Solvermol™ and Empol®, available from Cognis Corporation, or bio-based polyols, such as the tetrafunctional polyol Agrol 4.0, available from BioBased Technologies, may also be utilized.

The anhydride that may be used to form the epoxy-adduct may comprise any suitable acid anhydride known in the art. For example, the anhydride may comprise hexahydrophthalic anhydride and its derivatives (e.g., methyl hexahydrophthalic anhydride); phthalic anhydride and its derivatives (e.g., methyl phthalic anhydride); maleic anhydride; succinic anhydride; trimelletic anhydride; pyromelletic dianhydride (PMDA); 3,3',4,4'-oxydiphthalic dianhydride (ODPA); 3,3',4,4'-benzophenone tetracarboxylic dianhydride (BTDA); and 4,4'-diphthalic (hexafluoroisopropylidene) anhydride (6FDA).

The diacid used to form the epoxy-adduct may comprise any suitable diacid known in the art. For example, the diacids may comprise phthalic acid and its derivates (e.g., methyl phthalic acid), hexahydrophthalic acid and its derivatives (e.g., methyl hexahydrophthalic acid), maleic acid, succinic acid, adipic acid, and the like.

The epoxy-adduct may comprise a diol, a monoanhydride or a diacid, and a diepoxy compound, wherein the mole ratio of diol, monoanhydride (or diacid), and diepoxy compounds in the epoxy-adduct may vary from 0.5:0.8:1.0 to 0.5:1.0:6.0.

The epoxy-adduct may comprise a triol, a monoanhydride or a diacid, and a diepoxy compound, wherein the mole ratio of triol, monoanhydride (or diacid), and diepoxy compounds in the epoxy-adduct may vary from 0.5:0.8:1.0 to 0.5:1.0:6.0.

The epoxy-adduct may comprise a tetraol, a monoanhydride or a diacid, and a diepoxy compound, wherein the mole ratio of tetraol, monoanhydride (or diacid), and diepoxy compounds in the epoxy-adduct may vary from 0.5:0.8:1.0 to 0.5:1.0:6.0.

Other suitable epoxy-containing compounds include epoxy-adducts such as polyesters formed as the reaction product of reactants comprising an epoxy-containing compound, a polyol, and an anhydride, as described in U.S. Pat.

No. 8,796,361, col. 3, line 42 through col. 4, line 65, the cited portion of which is incorporated herein by reference.

The epoxy-adducts, when used, may be present in the composition in an amount of at least 0.5 percent by weight based on the total weight of the composition, such as at least 10 percent by weight, such as at least 30 percent by weight, and may be present in an amount of no more than 70 percent by weight, such as no more than 65 percent by weight, such as no more than 50 percent by weight. The epoxy adducts may be present in the composition in an amount of 0.5 percent to 70 percent by weight based on the total weight of the composition, such as 10 percent by weight to 65 percent by weight, such as 30 percent by weight to 50 percent by weight.

The epoxy-containing compound may have an epoxide equivalent weight of at least 90 g/eq, such as at least 140 g/eq, such as at least 188 g/eq, such as more than 350 g/eq, and may have an epoxide equivalent weight of no more than 2,000 g/eq, such as no more than 1,000 g/eq, such as no more than 350 g/eq. The epoxy-containing compound may have an epoxide equivalent weight of 90 g/eq to 2,000 g/eq, such as 140 g/eq to 1,000 g/eq, such as 90 g/eq to 400 g/eq, such as 188 g/eq to 350 g/eq, such as more than 350 g/eq to 2,000 g/eq, such as more than 400 g/eq to 1,000 g/eq.

The epoxy-containing compound may be present in the composition in an amount of at least 3 weight percent based on total weight of the composition, such as at least 7.7 weight percent, such as at least 13 weight percent, and may be present in the composition in an amount of no more than 85 weight percent based on total weight of the composition, such as no more than 77 weight percent, such as no more than 60 weight percent. The epoxy-containing compound may be present in the composition in an amount of 3 weight percent to 85 weight percent based on total weight of the composition, such as 7.7 weight percent to 77 weight percent, such as 13 weight percent to 60 weight percent.

The first component and/or the second component may comprise elastomeric particles. In an example, the epoxy-containing compound of the composition may further include elastomeric particles. As used herein, "elastomeric particles" refers to particles having a glass transition temperature (Tg) of −70° C. to 0° C. as measured by Differential Scanning Calorimetry (DSC) or Dynamic Mechanical Analysis (DMA). The elastomeric particles may be included in an epoxy carrier resin for introduction into the coating composition. The elastomeric particles may be phase-separated from the epoxy in the epoxy-containing compound. As used herein, the term "phase-separated" means forming a discrete domain within a matrix of the epoxy-containing compound.

The elastomeric particles may have a core/shell structure. Suitable core-shell elastomeric particles may be comprised of an acrylic shell and an elastomeric core. The core may comprise natural or synthetic rubbers, polybutadiene, styrene-butadiene, polyisoprene, chloroprene, acrylonitrile butadiene, butyl rubber, polysiloxane, polysulfide, ethylene-vinyl acetate, fluoroelastomer, polyolefin, hydronated styrene-butadiene, or combinations thereof. The type of elastomeric particles and the concentration thereof is not limited as long as the particle size falls within the specified range as illustrated below.

The average particle size of the elastomeric particles may be, for example, 0.02 microns to 5 microns, such as 50 nm to 250 nm, the reported particle sizes for rubber particles provided by Kanekea Texas Corporation, as measured by standard techniques known in the industry. Suitable methods of measuring particles sizes disclosed herein include, for example, according to ISO 13320 and ISO 22412 or as measured by transmission electron microscopy (TEM). Suitable methods of measuring particle sizes by TEM include suspending elastomeric particles in a solvent selected such that the particles do not swell, and then drop-casting the suspension onto a TEM grid which is allowed to dry under ambient conditions. For example, epoxy resin containing core-shell elastomeric particles may be diluted in butyl acetate for drop casting and measurements may be obtained from images acquired from a Tecnai T20 TEM operating at 200 kV and analyzed using ImageJ software, or an equivalent solvent, instrument and software.

In an example, suitable finely dispersed core-shell elastomeric particles having an average particle size ranging from 50 nm to 250 nm may be master-batched in epoxy resin such as aromatic epoxides, phenolic novolac epoxy resin, bisphenol A and/or bisphenol F diepoxide, and/or aliphatic epoxides, which include cyclo-aliphatic epoxides, at concentrations ranging from 5% to 40% rubber particles by weight based on the total weight of the rubber dispersion, such as from 20% to 35%. Suitable epoxy resins may also include a mixture of epoxy resins. When utilized, the epoxy carrier resin may be an epoxy-containing component of the present invention such that the weight of the epoxy-containing component present in the composition includes the weight of the epoxy carrier resin.

Exemplary non-limiting commercial core-shell elastomeric particle products using poly(butadiene) rubber particles that may be utilized in the composition include core-shell poly(butadiene) rubber powder (commercially available as PARALOID™ EXL 2650A from Dow Chemical), a core-shell poly(butadiene) rubber dispersion (25% core-shell rubber by weight) in bisphenol F diglycidyl ether (commercially available as Kane Ace MX 136), a core-shell poly(butadiene) rubber dispersion (33% core-shell rubber by weight) in Epon® 828 (commercially available as Kane Ace MX 153), a core-shell poly(butadiene) rubber dispersion (33% core-shell rubber by weight) in Epiclon® EXA-835LV (commercially available as Kane Ace MX 139), a core-shell poly(butadiene) rubber dispersion (37% core-shell rubber by weight) in bisphenol A diglycidyl ether (commercially available as Kane Ace MX 257), and a core-shell poly(butadiene) rubber dispersion (37% core-shell rubber by weight) in Epon® 863 (commercially available as Kane Ace MX 267), and core-shell poly(butadiene) rubber dispersion (40% rubber by weight) in bisphenol A diglycidyl ether (commercially available as Kane Ace MX 150), each available from Kaneka Texas Corporation, and acrylic rubber dispersions.

Exemplary non-limiting commercial core-shell elastomeric particle products using styrene-butadiene rubber particles that may be utilized in the composition include a core-shell styrene-butadiene rubber powder (commercially available as CLEARSTRENGTH® XT100 from Arkema), core-shell styrene-butadiene rubber powder (commercially available as PARALOID™ EXL 2650J), a core-shell styrene-butadiene rubber dispersion (33% core-shell rubber by weight) in bisphenol A diglycidyl ether (commercially available as Fortegra™ 352 from Olin™), core-shell styrene-butadiene rubber dispersion (33% rubber by weight) in low viscosity bisphenol A diglycidyl ether (commercially available as Kane Ace MX 113), a core-shell styrene-butadiene rubber dispersion (25% core-shell rubber by weight) in bisphenol A diglycidyl ether (commercially available as Kane Ace MX 125), a core-shell styrene-butadiene rubber dispersion (25% core-shell rubber by weight) in bisphenol F diglycidyl ether (commercially available as Kane Ace MX 135), a core-shell styrene-butadiene rubber dispersion (25% core-shell rubber by weight) in D.E.N.™-438 phenolic novolac epoxy (commercially available as Kane Ace MX 215), a core-shell styrene-butadiene rubber dispersion (25% core-shell rubber by weight) in Araldite® MY-721 multi-functional epoxy (commercially available as Kane Ace MX 416), a core-shell styrene-butadiene rubber dispersion (25% core-shell rubber by weight) in MY-0510 multi-functional epoxy (commercially available as Kane Ace MX 451), a core-shell styrene-butadiene rubber dispersion (25% core-shell rubber by weight) in Syna Epoxy 21 Cyclo-aliphatic Epoxy from Synasia (commercially available as Kane Ace MX 551), and a core-shell styrene-butadiene rubber dispersion (25% core-shell rubber by weight) in polypropylene glycol (MW 400) (commercially available as Kane Ace MX 715), each available from Kaneka Texas Corporation. Other commercially available core-shell rubber particle dispersions include Fortegra 352 (33% core-shell rubber particles by weight in bisphenol A liquid epoxy resin), available from Olin Corporation. Other commercially available core-shell rubber particle dispersions include Paraloid™ EXL 2650A (core-shell poly(butadiene) commercially available from Dow.

Exemplary non-limiting commercial core-shell elastomeric particle products using polysiloxane rubber particles that may be utilized in the composition include a core-shell polysiloxane rubber powder (commercially available as GENIOPERL® P52 from Wacker), a core-shell polysiloxane rubber dispersion (40% core-shell rubber by weight) in bisphenol A diglycidyl ether (commercially available as ALBIDUR® EP2240A from Evonick), a core-shell polysiloxane rubber dispersion (25% core-shell rubber by weight) in jER™828 (commercially available as Kane Ace MX 960), a core-shell polysiloxane rubber dispersion (25% core-shell rubber by weight) in Epon® 863 (commercially available as Kane Ace MX 965) each available from Kaneka Texas Corporation.

The elastomeric particles may be present in the composition in an amount of at least 1 percent by weight based on the total weight of the composition, such as at least 10 percent by weight, and may be present in an amount of no more than 25 percent by weight, such as no more than 15 percent by weight. The elastomeric particles may be present in the composition in an amount of 1 percent by weight to 25 percent by weight based on the total weight of the composition, such as 10 percent by weight to 15 percent by weight.

The elastomeric particles may be present in the composition in an amount such that the weight ratio of epoxy-containing compounds to core-shell rubber particles may be at least 2:1, such as at least 2.5:1, such as at least 3.0:1, and may be no more than 6:1, such as no more than 5.5:1, such as no more than 5:1. The elastomeric particles may be present in the composition in an amount such that the weight ratio of epoxy-containing compounds to core-shell rubber particles may be 2:1 to 6:1, such as 2.5:1 to 3.0:1, such as 3:1 to 5:1.

As discussed above, the compositions disclosed herein also may comprise a polythiol curing agent. The polythiol curing agent may be present in the first component and/or the second component of the composition.

The polythiol curing agent may comprise a compound comprising at least two thiol functional groups. For example, the polythiol curing agent may comprise a dithiol, trithiol, tetrathiol, pentathiol, hexathiol or higher functional polythiol compound. The polythiol curing agent may comprise a dithiol compound such as 3,6-dioxa-1,8-octanedithiol (DMDO), 3-oxa-1,5-pentanedithiol, 1,2-ethanedithiol, 1,3-propanedithiol, 1,2-propanedithiol, 1,4-butanedithiol, 1,3-butanedithiol, 2,3-butanedithiol, 1,5-pentanedithiol, 1,3-pentanedithiol, 1,6-hexanedithiol, 1,3-dithio-3-methylbutane, ethylcyclohexyldithiol (ECHDT), methylcyclohexyldithiol, methyl-substituted dimercaptodiethyl sulfide, dimethyl-substituted dimercaptodiethyl sulfide, 2,3-dimercapto-1-propanol, bis-(4-mercaptomethylphenyl) ether, 2,2'-thiodiethanethiol, and glycol dimercaptoacetate (commercially available as THIOCURE® GDMA from BRUNO BOCK Chemische Fabrik GmbH & Co. KG). The polythiol curing agent may comprise a trithiol compound such as trimethylolpropane trimercaptoacetate (commercially available as THIOCURE® TMPMA from BRUNO BOCK Chemische Fabrik GmbH & Co. KG), trimethylopropane tris-3-mercaptopropionate (commercially available as THIOCURE® TMPMP from BRUNO BOCK Chemische Fabrik GmbH & Co. KG), ethoxylated trimethylpropane tris-3-mercaptopropionate polymer (commercially available as THIOCURE® ETTMP from BRUNO BOCK Chemische Fabrik GmbH & Co. KG), tris[2-(3-mercaptopropionyloxy) ethyl]isocyanurate (commercially available as THIOCURE® TEMPIC from BRUNO BOCK Chemische Fabrik GmbH & Co. KG). The polythiol curing agent may comprise a tetrathiol compound such as pentaerythritol tetramercaptoacetate (commercially available as THIOCURE® PETMA from BRUNO BOCK Chemische Fabrik GmbH & Co. KG), pentaerythritol tetra-3-mercaptopropionate (commercially available as THIOCURE® PETMP from BRUNO BOCK Chemische Fabrik GmbH & Co. KG), and polycaprolactone tetra(3-mercaptopropionate) (commercially available as THIOCURE® PCL4MP 1350 from BRUNO BOCK Chemische Fabrik GmbH & Co. KG). Higher functional polythiol curing agents may include dipentaerythritol hexa-3-mercaptopropionate (commercially available as THIOCURE® DiPETMP from BRUNO BOCK Chemische Fabrik GmbH & Co. KG). Combinations of polythiol curing agents may also be used.

The polythiol curing agent may comprise a mercaptan terminated polysulfide. Commercially available mercaptan terminated polysulfides include those sold under the trade name THIOKOL® LP from Toray Fine Chemicals Co., Ltd., including, but not limited to, LP-3, LP-33, LP-23, LP-980, LP-2, LP-32, LP-12, LP-31, LP-55 and LP-56. The THIOKOL LP mercaptan terminated polysulfides have the general structure HS—$(C_2H_4$—O—$CH_2$—O—$C_2H_4$—S—S$)_n$—$C_2H_4$—O—$CH_2$—O—$C_2H_4$—SH, wherein n is an integer of 5 to 50. Other commercially available mercaptan terminated polysulfides include those sold under the trade name THIOPLAST® G™ from Akzo Nobel Chemicals International B.V., including, but not limited to, G 10, G 112, G 131, G 1, G 12, G 21, G 22, G 44 and G 4. The THIOPLAST G mercaptan terminated polysulfides are blends of di- and tri-functional mercaptan-functional polysulfides with the di-functional unit having the structure HS—(R—S—S$)_n$—R—SH, wherein n is an integer from 7 to 38, and the tri-functional unit having the structure HS—(R—S—S$)_a$—$CH_2$—CH((S—S—R$)_c$—SH)—$CH_2$—(S—S—R$)_b$—SH, wherein a+b+c=n and n is an integer from 7 to 38.

The polythiol curing agent may comprise a mercaptan terminated polyether. Commercially available mercaptan terminated polyether include POLYTHIOL QE-340M available from Toray Fine Chemicals Co., Ltd.

The polythiol curing agent may comprise a thiol-terminated sulfur-containing polymer. The sulfur-containing polymer may comprise a polythioether, a polysulfide, and a combination thereof. The sulfur-containing polymer may comprise a mixture of different polythioethers and/or polysulfides, and the polythioethers and/or polysulfides may have the same or different functionality. In examples, the sulfur-containing polymer may have an average functionality of at least 2, such as no more than 6, such as no more than 4, such as no more than 3. In examples, the sulfur-containing polymer may have an average functionality of 2 to 6, such as 2 to 4, such as 2 to 3, such as 2.05 to 2.8. For example, a sulfur-containing polymer can be selected from a difunctional sulfur-containing polymer, a trifunctional sulfur-containing polymer, and a combination thereof.

In examples, a sulfur-containing polymer may be thiol-terminated, and in examples, may comprise a thiol-terminated polythioether. Examples of thiol-terminated polythioethers are disclosed, for example, in U.S. Pat. No. 6,172,179. In examples, a thiol-terminated polythioether may comprise Permapol® P3.1E, available from PPG Aerospace, Sylmar, Calif.

The polythiol curing agent may have a thiol equivalent weight of at least 80 g/eq, such as at least 100 g/eq, such as at least 125 g/eq, such as more than 600 g/eq, and may have a thiol equivalent weight of no more than 2,500 g/eq, such as no more than 2,000 g/eq, such as no more than 1,650 g/eq, such as no more than 600 g/eq. The polythiol curing agent may have a thiol equivalent weight of 80 g/eq to 2,500 g/eq, such as 100 g/eq to 2,000 g/eq, such as 125 g/eq to 1,650 g/eq, such as 80 g/eq to 600 g/eq, such as more than 600 g/eq to 2,500 g/eq.

The polythiol curing agent may be present in the composition in an amount such that the ratio of the epoxide equivalent weight of epoxy-containing compound to the thiol equivalent weight of the polythiol curing agent may be at least 1:30, such as at least 1:12, and may be no more than 10:1, such as no more than 4:1. The polythiol curing agent may be present in the composition in an amount such that the ratio of the epoxide equivalent weight of epoxy compounds to the thiol equivalent weight of the polythiol curing agent may be 1:30 to 10:1, such as 1:12 to 4:1.

The polythiol curing may be present in the composition in an amount of at least 5 weight percent based on total weight of the composition, such as at least 10 weight percent, and may be present in the composition in an amount of no more than 60 weight percent based on total weight of the composition, such as no more than 40 weight percent. The polythiol curing agent may be present in the composition in an amount of 5 weight percent to 60 weight percent based on total weight of the composition, such as 10 weight percent to 40 weight percent.

The second component of the composition may comprise a second curing agent. The composition may further comprise a second curing agent. The second curing agent may comprise an unblocked curing agent.

Suitable curing agents that may be used in accordance with the present invention thus include for example quaternary amines, tertiary amines, cyclic tertiary amines, secondary amines, or primary that react with an epoxide group of an epoxy-containing compound at room temperature to form a Lewis acid-base pair, a quaternary amine, a tertiary amine or a secondary amine; or primary, secondary, or tertiary amines that are sufficiently basic to deprotonate a thiol group of the polythiol curing agent to form a thiolate ion that may further react with an epoxide group of an epoxy-containing compound to form a thioether. As examples of tertiary amines, the curing agent may comprise an alkanolamine. As used herein, the term "alkanolamine" refers to a compound comprising a nitrogen atom bonded to at least one alkanol substituent comprising an alkyl group comprising a primary, secondary or tertiary hydroxyl group. The alkanolamine may have the general structure $R^1{}_nN(R^2\text{—OH})_{3-n}$, wherein $R^1$ comprises hydrogen or an alkyl group, $R^2$ comprises an alkanediyl group, and n=0, 1 or 2. When n=2, two $R^1$ groups will be present, and these groups may be the same or different. When n=0 or 1, 2 or 3 $R^2$—OH groups will be present, and these groups may be the same or different. The alkyl groups comprise aliphatic linear or branched carbon chains that may be unsubstituted or substituted with, for example, ether groups. Suitable alkanolamines include monoalkanolamines such as ethanolamine, N-methylethanolamine, 1-amino-2-propanol, and the like, dialkanolamines such as diethanolamine, diisopropanolamine, and the like, and trialkanolamines such as trimethanolamine, triethanolamine, tripropanolamine, tributanolamine, tripentanolamine, trihexanolamine, triisopropanolamine, and the like. As examples, the cyclic tertiary amine may comprise 1,4-diazabicyclo[2.2.2]octane ("DABCO"), 1,8-diazabicylo[5.4.0]undec-7-ene ("DBU"), 1,5-diazabicyclo[4.3.0]non-5-ene ("DBN"), 1,5,7-triazabicyclo[4.4.0]dec-5-ene ("TBD"), and combinations thereof. The quaternary amines may comprise tetrabutylammonium bromide, tetrabutylammonium chloride, and benzyltrimethylammonium bromide.

Additional examples of suitable unblocked curing agents include, pyridine, imidazole, dimethylaminopyridine, 1-methylimidazole, N,N'-carbonyldiimidazole, 2-heptadeclimidazole, [2,2]bipyridine, 2,4,6-tris(dimethylamino methyl)phenol, 3,5-dimethylpyrazole, phenalkamines (such as NX-5600 series and LITE 2400 series available from Cardolite), phenalkamide (such as LITE 3000 series from Cardolite), and combinations thereof.

The unblocked curing agents may be present in the composition in an amount of at least 0.05 percent by weight based on the total weight of the composition, such as at least 0.2 percent by weight, such as at least 0.3 percent by weight, and may be present in an amount of no more than 8 percent by weight based on total weight of the composition, such as no more than 5 percent by weight, such as no more than 4 percent by weight. The curing agents may be present in the composition in an amount of 0.05 percent to 8 percent by weight based on the total weight of the composition, such as 0.2 percent to 5 percent by weight, such as 0.3 percent to 4 percent by weight.

According to the present invention, the composition may be substantially free of aromatic amine curing agents. As used herein, the term "aromatic amine curing agent" refers to amine compounds having an aromatic group. Examples of aromatic groups include phenyl and benzyl groups. As used herein, a composition may be "substantially free" of aromatic amine curing agents if aromatic amine curing agents are present in an amount of 0.1% or less by weight based on the total weight of the composition. The composition may be essentially free of aromatic amine curing agents. As used herein, a composition may be "essentially free" of aromatic amine curing agents if aromatic amine curing agents are present in an amount of 0.01% or less by weight based on the total weight of the composition. The composition may be completely free of aromatic amine curing agents. As used herein, a composition may be "completely free" of aromatic amine curing agents if aromatic amine curing agents are not present in the composition, i.e., 0.00% by weight.

The theoretical maximum crosslink density (XLD) of the compositions disclosed herein may be calculated according to the formula:

$$XLD = \sum_{i=A}^{N} \frac{X_i}{2EW_i^f}$$

where XLD is the crosslink density in moles/g (or moles/kg), $X_i$ is the weight fraction of polymer i, EW' is the adjusted equivalent weight accounting for two functional groups forming a linear polymer and calculated by with the following equation $$\frac{1}{EW'_i} = \frac{1}{EW_i} - \frac{2}{Mw_i}$$

where EW is the functional group equivalent weight in g/mol of the polymer and Mw is the weight average molecular weight of the polymer in g/mol. As used herein, the calculation of theoretical maximum crosslink density only includes reactive epoxide functional resins and reactive thiol functional resins. For non-polymeric species, EW and Mw are calculated based on the known chemical structure. For polymeric species, Mw is determined by GPC (described above) and EW is determined by titration (described above). In instances where rubber particles are dispersed in epoxy resins, the base resin is used to calculate XLD, correcting for the mass of particles as the particles interfere with GPC and EW measurements.

The theoretical maximum crosslink density of the reactive epoxide functional resins and the reactive thiol function resins may be at last 0.9 mol/kg, such as at least 1.2 mol/kg, such as at least 1.3 mol/kg, such as at least 1.5 mol/kg, and may be no more than 4 mol/kg, such as no more than 3 mol/kg, such as no more than 2.5 mol/kg. The theoretical maximum crosslink density of the reactive epoxide functional resins and the reactive thiol function resins may be 0.9 mol/kg to 3 mol/kg, such as 1.2 mol/kg to 2.5 mol/kg, such as 1.3 mol/kg to 4 mol/kg, such as 1.5 mol/kg to 2.5 mol/kg.

According to the present invention, the composition may be substantially free, essentially free, or completely free of a latent curing agent. As used herein, a composition is "substantially free" of a latent curing agent if the latent curing agent is present in an amount of less than 0.001% by weight, based on the total weight of the composition. As used herein, a composition is "essentially free" of a latent curing agent if the latent curing agent is present in an amount of less than 0.0005% by weight, based on the total weight of the composition. As used herein, a composition is "completely free" of a latent curing agent if the latent curing agent is not present in the composition, i.e., 0.0000% by weight.

A filler material or more than one filler material may optionally be added to the composition. Useful fillers that may be introduced to the composition to provide improved mechanical materials such as fiberglass, fibrous titanium dioxide, whisker type calcium carbonate (aragonite), and carbon fiber (which includes graphite and carbon nanotubes). In addition, fiber glass ground to 5 microns or wider and to 50 microns or longer may also provide additional tensile strength. Additionally, filler material may optionally be graphene and graphenic carbon particles (for example, xGnP graphene nanoplatelets commercially available from XG Sciences, and/or for example, carbon particles having structures comprising one or more layers of one-atom-thick planar sheets of sp2-bonded carbon atoms that are densely packed in a honeycomb crystal lattice. The average number of stacked layers may be less than 100, for example, less than 50. The average number of stacked layers may be 30 or less, such as 20 or less, such as 10 or less, such as 5 or less. The graphenic carbon particles may be substantially flat; however, at least a portion of the planar sheets may be substantially curved, curled, creased, or buckled. The particles typically do not have a spheroidal or equiaxed morphology. Suitable graphenic carbon particles are described in U.S. Publication No. 2012/0129980, at paragraphs [0059]-[0065], the cited portion of which is incorporated herein by reference. Other suitable graphenic carbon particles are described in U.S. Pat. No. 9,562,175, at 6:6 to 9:52, the cited portion of which are incorporated herein by reference.

Organic and/or inorganic fillers, such as those that are substantially spherical, may optionally be added to the composition. Useful organic fillers that may be introduced include cellulose, starch, and acrylic. Useful inorganic fillers that may be introduced include borosilicate, aluminosilicate, calcium inosilicate (Wollastonite), mica, silica, talc, and calcium carbonate. The organic and inorganic fillers may be solid, hollow, or layered in composition and may range in size from 10 nm to 1 mm in at least one dimension.

Optionally, additional fillers, thixotropes, colorants, tints and/or other materials also may be added to the composition.

Useful thixotropes that may be used include untreated fumed silica and treated fumed silica, castor wax, clay, organo clay and combinations thereof. In addition, fibers such as synthetic fibers like Aramid® fiber and Kevlar® fiber, acrylic fibers, and/or engineered cellulose fiber may also be utilized.

Useful colorants, dyes, or tints may include red iron pigment, titanium dioxide, calcium carbonate, and phthalocyanine blue and combinations thereof.

Useful fillers that may be used in conjunction with thixotropes may include inorganic fillers such as inorganic clay or silica and combinations thereof.

Exemplary other materials that may be utilized include, for example, calcium oxide and carbon black and combinations thereof.

Such fillers, if present at all, may be present in the composition in an amount of at least 10 percent by weight based on total weight of the composition, such as no more than 20 percent by weight, and may be present in an amount of no more than 60 percent by weight, such as no more than 50 percent by weight. Such fillers, if present at all, may be present in the composition in an amount of 10 percent by weight to 60 percent by weight based on total weight of the composition, such as no more than 20 percent by weight based on 50 percent by weight.

Optionally, the composition may be substantially free, or essentially free, or completely free, of platy fillers such as talc, pyrophyllite, chlorite, vermiculite, or combinations thereof. Optionally, the composition may be substantially free, or essentially free, or completely free, of alumina fillers, including plate-like alumina particles, spherical alumina particles, and/or amorphous alumina particles.

The composition may optionally comprise glass microspheres. The glass microspheres may be hollow borosilicate glass. Non-limiting examples of commercially available glass microspheres include 3M Glass bubbles type VS, K series, and S series available from 3M.

Glass microspheres may be present in the composition in an amount of at least 1 percent by weight based on the total weight of the composition, such as at least 2 percent by weight, such as at least 2.5 percent by weight, and may be present in an amount of no more than 30 percent by weight, such as no more than 25 percent by weight, such as no more than 22 percent by weight. Glass microspheres may be present in the composition in an amount of 1 percent to 30 percent by weight based on total weight of the composition, such as 2 percent to 25 percent, such as 2.5 percent to 22 percent.

The composition optionally may comprise at least one plasticizer. As used herein, "plasticizer" refers to a non-polymeric, non-reactive molecule that may be added to the composition to increase flexibility, increase elongation, lower the glass transition temperature, and/or decrease the viscosity.

Examples of plasticizers include phthalate esters such as diisononylphthalate (Jayflex DINP available from Exxon Mobile), diisodecylphthalate (Jayflex DIDP available from Exxon Mobile), and alkyl benzyl phthalate (Santicizer 278 available from Valtris); benzoate-based plasticizers such as dipropylene glycol dibenzoate (K-Flex® available from Emerald Performance Materials); aliphatic esters such as dimethyl adipate, dimethyl sebacate, dibutyl sebacate; and other plasticizers including terephthalate-based dioctyl terephthalate (DEHT available from Eastman Chemical Company); alkylsulfonic acid ester of phenol (Mesamoll available from Borchers); esters of citric acid such as triethyl ester of citric acid (Citroflex 2 from Morflex) and tributyl ester of citric acid (Citroflex 4 from Morflex); and 1,2-cyclohexane dicarboxylic acid diisononyl ester (Hexamoll DINCH available from BASF). Optionally, the composition may be substantially free, or essentially free, or completely free of plasticizer.

The plasticizer, if present at all, may be present in the composition in an amount of at least 1 percent by weight based on the total weight of the composition, such as at least 2 percent by weight, such as at least 3 percent by weight, and may be present in an amount of no more than 15 percent by weight, such as no more than 10 percent by weight, such as no more than 8 percent by weight. The plasticizer may be present in the composition in an amount of 1 percent to 15 percent by weight based on total weight of the composition, such as 2 percent to 10 percent by weight, such as 3 percent to 8 percent by weight.

The composition also may comprise at least one elastomer, such as a reactive or non-reactive elastomeric resin. As used herein, the term "elastomer" refers to a polymeric species added to the composition to increase flexibility and/or increase elongation.

Examples of commercially available non-reactive elastomers include Polyvest® polybutadiene available from Evonik. Examples of reactive elastomers include Hypro® ATBN amine-functional butadiene copolymer available from Emerald Performance Materials, MS Polymer® silyl-terminated polypropylene gylcol available from Kaneka, Geniosil® polyether-based silane terminated polymers available from Wacker, and Desmoseal® silane-terminates polyurethane available from Covestro. Optionally, the composition may be substantially free, or essentially free, or completely free, of elastomer.

The elastomer, if present at all, may be present in the composition in an amount of at least 5 percent by weight based on the total weight of the composition, such as at least 8 percent by weight, and may be present in an amount of no more than 25 percent by weight, such as no more than 20 percent by weight. The plasticizer may be present in the composition in an amount of 5 percent by weight to 25 percent by weight based on total weight of the composition, such as 8 percent by weight to 20 percent by weight.

The composition also may comprise at least one reactive diluent. As used herein, the term "reactive diluent" refers to a molecule or a compound that has a low vapor pressure such as 2 mm Hg or less at 25° C. and is used to lower the viscosity of a resin but that has at least one functional group capable of reacting with a functional group(s) on molecules or compounds in a composition.

The reactive diluent may be a monomer or a polymer, and may be mono-functional, bi-functional, or multi-functional. Suitable examples of reactive diluent include 1,4-butandiol diglycidyl ether (available as Heloxy modifier BD from Hexion), 1,6-hexanediol diglycidyl ether, mono-functional aliphatic diluents (Epotec RD 108, RD 109, RD 188 available from Aditya Birla), and mono-functional aromatic reactive diluents (Epotec RD 104, RD 105, and RD 136 available from Aditya Birla). Other suitable examples of the reactive diluent include chemically modified functionalized saturated oils, epoxidized castor oil, unsaturated oils such as glycerides of polyunsaturated fatty acids such as nut oils or seed oils, including as examples cashew nut oil, sunflower oil, safflower oil, soybean oil, linseed oil, castor oil, orange oil, rapeseed oil, tall oil, vegetable processing oil, vulcanized vegetable oil, high oleic acid sunflower oil, and combinations thereof.

The reactive diluent may have a boiling point of greater than 100° C., such as greater than 130° C., such as greater than 150° C., for example, and the reactive diluent may have a boiling point of less than 425° C., such as less than 390° C., such as less than 360° C., for example.

The reactive diluent can lower the viscosity of the mixture. According to the present invention, the reactive diluent may have a viscosity of from 1 mPa·s to 4,000 mPa·s at 25° C. according to ASTM D789, such as for example, from 1 mPa·s to 3,000 mPa·s, 1 mPa·s to 2,000 mPa·s, 1 mPa·s to 1,000 mPa·s, 1 mPa·s to 100 mPa·s, or 2 mPa·s to 30 mPa·s.

Optionally, the composition may be substantially free, or essentially free, or completely free, of reactive diluent.

The composition of the present invention may comprise, or consist essentially of, or consist of, a polythiol curing agent, a first component, and a second component that chemically reacts with the first component. The polythiol curing agent may be part of the first component and/or the second component. A portion of the polythiol curing agent may be included in the first component such that the polythiol curing agent is present in both the first and second components of the composition. Accordingly, the first component may comprise, or consist essentially of, or consist of, one of the epoxy-containing compounds described above and optionally one of the polythiol curing agents described above. The second component may comprise, or consist essentially of, or consist of, the second curing agent and optionally one of the polythiol curing agents described above. As used herein, the first component of the composition "consists essentially of" an epoxy-containing compound and optionally a polythiol curing agent when the maximum amount of other components is 5% by weight or less based on total weight of the first component. As used herein, the second component of the composition "consists essentially of" the second curing agent and optionally a polythiol curing agent when the maximum amount of other components is 5% by weight or less based on total weight of the second component.

According to the present invention, the composition may be substantially free of a color change indicator. As used herein, the term "color change indicator" refers to a compound that at least partially changes the color of the composition during the curing process. Examples of color change indicators include inorganic and organic dyes, such as azo compounds or azo dyes, including Solvent Red 26 (1-[[2,5-dimethyl-4-[(2-methylphenyl)azo]-phenyl]azo]-2-naphthol) and Solvent Red 164 (1-[[4-[phenylazo]-phenyl]azo]-2-naphtholor), as well as pH dependent color change indicators, such as, for example, phenolphthalein. As used herein, a composition is "substantially free" of color change indicator if color change indicator is present in the composition in an amount of 0.05% or less based on the total weight of the composition. The composition may be essentially free of color change indicator. As used herein, a composition is "essentially free" of color change indicator if color change indicator is present in the composition in an amount of 0.01% or less based on the total weight of the composition. The composition may be completely free of color change indicator. As used herein, a composition is "completely free" of color change indicator if color change indicator is not present in the composition, i.e., 0.0% by weight.

According to the present invention, the composition may be substantially free of silane. As used herein, a composition is "substantially free" of silane if silane is present in the composition in an amount of 0.5% by weight or less based on the total weight of the composition. The composition may be essentially free of silane. As used herein, a composition is "essentially free" of silane if silane is present in the composition in an amount of 0.1% by weight or less based on the total weight of the composition. The composition may be completely free of silane. As used herein, a composition is "completely free" of silane if silane is not present in the composition, i.e., 0.0% by weight.

The present invention may also be a method for preparing a composition comprising, or in some cases consisting of, or in some cases consisting essentially of, a first component comprising an epoxy-containing component and optionally a polythiol curing agent and any of the optional further components, if used, described above, and a second component comprising a second curing agent and optionally a polythiol curing agent and any of the optional further components, if used, described above, the method comprising, or in some cases consisting of, or in some cases consisting essentially of, mixing the first component and the second component at a temperature of less than 50° C., such as 0° C. to 50° C., such as 15° C. to 35° C., such as at ambient temperature.

The present invention also is directed to a method for treating a substrate comprising, or consisting essentially of, or consisting of, contacting at least a portion of a surface of the substrate with one of the compositions described hereinabove. The composition may be cured to form a coating, layer or film on the substrate surface under ambient conditions or by exposing the treated substrate to a temperature of 130° C. or below, such as 90° C. or below.

The composition described above may be applied alone or as part of a system that can be deposited in a number of different ways onto a number of different substrates. The system may comprise a number of the same or different films, coatings, or layers. A film, coating, or layer is typically formed when a composition that is deposited onto at least a portion of the substrate surface is at least partially cured by methods known to those of ordinary skill in the art (e.g., under ambient conditions or by exposure to thermal heating).

The composition can be applied to the surface of a substrate in any number of different ways, non-limiting examples of which include brushes, rollers, films, pellets, spray guns and applicator guns.

After application to the substrate(s), the composition may be cured. For example, the composition may be allowed to cure at room temperature or slightly thermal conditions and/or the composition may be cured by baking and/or curing at elevated temperature, such as 100° C. or below, such as 90° C. or below, such as 80° C. or below, such as 70° C. or below, for any desired time period (e.g., from 5 minutes to 1 hour) sufficient to at least partially cure the composition on the substrate(s).

After the composition is applied to a substrate and at least partially cured, the treated substrate may surprisingly demonstrate at least one of the following:
(a) a sound damping loss factor of at least 0.02 at 200 Hz, 10° C., 2.5 mm sealant thickness measured according to SAE test method J1637 and ASTM E-756 on 240 mm long, 10 mm wide, and 1 mm thick steel panels coated along 215 mm of the length;
(b) a sound damping loss factor of at least 0.04 at 400 Hz, 10° C., 2.5 mm sealant thickness measured according to SAE test method J1637 and ASTM E-756 on 240 mm long, 10 mm wide, and 1 mm thick steel panels coated along 215 mm of the length;
(c) a sound damping loss factor of at least 0.06 at 800 Hz, 10° C., 2.5 mm sealant thickness measured according to SAE test method J1637 and ASTM E-756 on 240 mm long, 10 mm wide, and 1 mm thick steel panels coated along 215 mm of the length;
(d) a load at failure greater than 1 MPa measured according to ASTM D-412 with a pull rate of 50 mm/min and a sample configuration as shown in FIG. 1; and/or
(e) an elongation of at least 50% measured according to ASTM D-412 with a pull rate of 50 mm/min and a sample configuration as shown in FIG. 1.

As stated above, the present disclosure is directed to sealant compositions that are used to treat substrates or substrate surfaces. The sealant may provide particular sound damping properties. The sealant composition may be applied to substrate surfaces, including, by way of non-limiting example, a vehicle body or components of an automobile frame or an airplane, and the sealant composition may be allowed to at least partially cure at ambient conditions. The sealant formed by the compositions disclosed herein provides sufficient sound damping, tensile strength and tensile elongation. The sealant composition may be applied to cleaned or uncleaned (i.e., including oily or oiled) substrate surfaces. It may also be applied to a substrate that has been pretreated, coated with an electrodepositable coating, coated with additional layers such as a primer, basecoat, or topcoat. Vehicles or parts coated with coating compositions may subsequently be baked in an oven to cure the coating composition.

As stated above, the present disclosure is directed to coating compositions that are used to treat or coat substrates or substrate surfaces. The coating may provide sealant properties. The coating composition may be applied to substrate surfaces, including, by way of non-limiting example, a vehicle body or components of an automobile frame or an airplane, and the coating composition may be allowed to at least partially cure at ambient conditions. The coating composition may be applied to cleaned or uncleaned (i.e., including oily or oiled) substrate surfaces. Vehicles or parts coated with coating compositions may subsequently be baked in an oven to cure the coating composition.

The 2K compositions disclosed herein surprisingly may be used in any suitable additive manufacturing technology, such as extrusion, jetting, and binder jetting.

The present disclosure is directed to the production of structural articles, such as by way of non-limiting example, sound damping pads, using three-dimensional printing. A three-dimensional article may be produced by forming successive portions or layers of an article by depositing the composition of the present invention onto a substrate and thereafter depositing additional portions or layers of the composition over the underlying deposited portion or layer and/or adjacent the previously deposited portion or layer. Layers can be successively deposited adjacent a previously deposited layer to build a printed article. First and second components of the composition can be mixed and then deposited or the first and second components of the composition can be deposited separately. When deposited separately, the first and second components can be deposited simultaneously, sequentially, or both simultaneously and sequentially.

By "portions of an article" is meant subunits of an article, such as layers of an article. The layers may be on successive horizontal parallel planes. The portions may be parallel planes of the deposited material or beads of the deposited material produced as discreet droplets or as a continuous stream of material. The first and second components may each be provided neat or may also include a solvent (organic and/or water) and/or other additives as described below. First and second components provided by the present disclosure may be substantially free of solvent. By substantially free is meant that the first and second components comprise less than 5 wt %, less than 4 wt %, less than 2 wt %, or less than 1 wt % of solvent, where wt % is based on the total weight of the first component or the second component, as the case may be. Similarly, the composition provided by the present disclosure may be substantially free of solvent, such as having less than 5 wt %, less than 4 wt %, less than 2 wt %, or less than 1 wt % of solvent, where wt % is based on the total weight of the composition.

The first and second components may be mixed together and subsequently deposited as a mixture of components that react to form portions of an article. For example, two components may be mixed together and deposited as a mixture of components that react to form a thermoset by delivery of at least two separate streams of the components into a mixer such as a static mixer and/or a dynamic mixer to produce a single stream that is then deposited. The components may be at least partially reacted by the time a composition comprising the reaction mixture is deposited. The deposited reaction mixture may react at least in part after deposition and may also react with previously deposited portions and/or subsequently deposited portions of the article such as underlying layers or overlying layers of the article.

Two or more components can be deposited using any suitable equipment. The selection of suitable deposition equipment depends on a number of factors including the deposition volume, the viscosity of the composition and the complexity of the part being fabricated. Each of the two or more components can be introduced into an independent pump and injected into a mixer to combine and mix the two components. A nozzle can be coupled to the mixer and the mixed composition can be pushed under pressure or extruded through the nozzle.

A pump can be, for example, a positive displacement pump, a syringe pump, a piston pump, or a progressive cavity pump. The two pumps delivering the two components can be placed in parallel or placed in series. A suitable pump can be capable of pushing a liquid or viscous liquid through a nozzle orifice. This process can also be referred to as extrusion. A component can be introduced into the mixer using two pumps in series.

For example, the first and second components can be deposited by dispensing materials through a disposable nozzle attached to a progressive cavity two-component dosing system such as a ViscoTec eco-DUO 450 precision dosing system, where the first and second components are mixed in-line. A two-component dosing system can comprise, for example, two progressive cavity pumps that separately dose reactants into a disposable static mixer dispenser or into a dynamic mixer. Other suitable pumps include positive displacement pumps, syringe pumps, piston pumps, and progressive cavity pumps. Upon dispensing, the materials of the first and second components form an extrudate which can be deposited onto a surface to provide an initial layer of material and successive layers on a base. The deposition system can be positioned orthogonal to the base, but also may be set at any suitable angle to form the extrudate such that the extrudate and deposition system form an obtuse angle with the extrudate being parallel to the base. The extrudate refers to the combined components, i.e., a composition, that have been mixed, for example, in a static mixer or in a dynamic mixer. The extrudate can be shaped upon passing through a nozzle.

The base, the deposition system, or both the base and the deposition system may be moved to build up a three-dimensional article. The motion can be made in a predetermined manner, which may be accomplished using any suitable CAD/CAM method and apparatus such as robotics and/or computerize machine tool interfaces.

An extrudate may be dispensed continuously or intermittently to form an initial layer and successive layers. For intermittent deposition, a dosing system may interface with a relay switch to shut off the pumps, such as the progressive cavity pumps and stop the flow of reactive materials. Any suitable switch such as an electromechanical switch that can be conveniently controlled by any suitable CAD/CAM methodology can be used.

A deposition system can include an in-line static and/or dynamic mixer as well as separate pressurized pumping compartments to hold the at least two components and feed the materials into the static and/or dynamic mixer. A mixer such as an active mixer can comprise a variable speed central impeller having high shear blades within a conical nozzle. A range of conical nozzles may be used which have an exit orifice dimension, for example, from 0.2 mm to 50 mm, from 0.5 mm to 40 mm, from 1 mm to 30 mm, or from 5 mm to 20 mm.

A range of static and/or dynamic mixing nozzles may be used which have, for example, an exit orifice dimension from 0.6 mm to 2.5 mm, and a length from 30 mm to 150 mm. For example, an exit orifice diameter can be from 0.2 mm to 4.0 mm, from 0.4 mm to 3.0 mm, from 0.6 mm to 2.5 mm, from 0.8 mm to 2 mm, or from 1.0 mm to 1.6 mm. A static mixer and/or dynamic can have a length, for example, from 10 mm to 200 mm, from 20 mm to 175 mm, from 30 mm to 150 mm, or from 50 mm to 100 mm. A mixing nozzle can include a static and/or dynamic mixing section and a dispensing section coupled to the static and/or dynamic mixing section. The static and/or dynamic mixing section can be configured to combine and mix the first and second components. The dispensing section can be, for example, a straight tube having any of the above orifice diameters. The length of the dispensing section can be configured to provide a region in which the components can begin to react and build viscosity before being deposited on the article. The length of the dispensing section can be selected, for example, based on the speed of deposition, the rate of reaction of the first and second components, and the desired viscosity.

First and second components can have a residence time in the static and/or dynamic mixing nozzle, for example, from 0.25 seconds to 5 seconds, from 0.3 seconds to 4 seconds, from 0.5 seconds to 3 seconds, or from 1 seconds to 3 seconds. Other residence times can be used as appropriate based on the curing chemistries and curing rates.

In general, a suitable residence time is less than the gel time of the composition. A suitable gel time can be less than 10 min, less than 8 min, less than 6 min, less than 5 min, less than 4 min, less than 3 min, less than 2 min, or less than 1 min. A gel time of the composition can be, for example, from 0.5 min to 10 min, from 1 min to 7 min, from 2 min to 6 min, or from 3 min to 5 min.

Compositions provided by the present disclosure can have a volume flow rate, for example, from 0.1 mL/min to 20,000 mL/min, such as from 1 mL/min to 12,000 mL/min, from 5 mL/min to 8,000 mL/min, or from 10 mL/min to 6,000 mL min. The volume flow rate can depend, for example, on the viscosity of the composition, the extrusion pressure, the nozzle diameter, and the reaction rate of the first and second components.

A composition can be used at a print speed, for example, from 1 mm/sec to 400 mm/sec, such as from 5 mm/sec to 300 mm/sec, from 10 mm/sec to 200 mm/sec, or from 15 mm/sec to 150 mm/sec. The printed speed can depend, for example, on the viscosity of the composition, the extrusion pressure, the nozzle diameter, and the reaction rate of the components. The print speed refers to the speed at which a nozzle used to extrude a composition move with respect to a surface onto which the composition is being deposited.

A composition can have a gel time, for example, less than 5 minutes, less than 4 minutes, less than 3 minutes, less than 2 minutes, less than 1 minute, less than 45 seconds, less than 30 seconds, less than 15 seconds, or less than 5 seconds. A composition can have a gel time, for example, from 0.1 seconds to 5 minutes, from 0.2 seconds to 3 minutes, from 0.5 seconds to 2 minutes, from 1 second to 1 minute, or from 2 seconds to 40 seconds. Gel time is considered as the time following mixing when the composition is no longer stirrable by hand.

A static and/or dynamic mixing nozzle can be heated or cooled to control, for example, the rate of reaction between the first and second components and/or the viscosity of the first and second components. An orifice of a deposition nozzle can have any suitable shape and dimensions. A system can comprise multiple deposition nozzles. The nozzles can have a fixed orifice dimension and shape, or the nozzle orifice can be controllably adjusted. The mixer and/or the nozzle may be cooled to control an exotherm generated by the reaction of the first and second components.

Methods provided by the present disclosure include printing the composition on a fabricated part. Methods provided by the present disclosure include directly printing parts.

Using the methods provided by the present disclosure parts can be fabricated. The entire part can be formed from one of the compositions disclosed herein, one or more portions of a part can be formed from one of the compositions disclosed herein, one or more different portions of a part can be formed using the compositions disclosed herein, and/or one or surfaces of a part can be formed from a composition provided by the present disclosure. In addition, internal regions of a part can be formed from a composition provided by the present disclosure.

The substrates that may be coated by the compositions of the present invention are not limited. Suitable substrates include, but are not limited to, materials such as metals or metal alloys, glass, natural materials such as wood, polymeric materials such as hard plastics, or composite materials. For example, suitable substrates include rigid metal substrates such as ferrous metals, aluminum, aluminum alloys, copper, and other metal and alloy substrates. The ferrous metal substrates used may include iron, steel, and alloys thereof. Non-limiting examples of useful steel materials include cold rolled steel, galvanized (zinc coated) steel, electrogalvanized steel, stainless steel, pickled steel, zinc-iron alloy such as GALVANNEAL, and combinations thereof. Combinations or composites of ferrous and non-ferrous metals can also be used. Aluminum alloys of the 2XXX, 5XXX, 6XXX, or 7XXX series as well as clad aluminum alloys and cast aluminum alloys of the A356 series also may be used as the substrate. Magnesium alloys of the AZ31B, AZ91C, AM60B, or EV31A series also may be used as the substrate. The substrate may also comprise titanium and/or titanium alloys. Other suitable non-ferrous metals include copper and magnesium, as well as alloys of these materials. Suitable metal substrates include those that are used in the assembly of vehicular bodies (e.g., without limitation, door, body panel, trunk deck lid, roof panel, hood, roof and/or stringers, rivets, landing gear components, and/or skins used on an aircraft), a vehicular frame, vehicular parts, motorcycles, wheels, and industrial structures and components. As used herein, "vehicle" or variations thereof includes, but is not limited to, civilian, commercial and military aircraft, and/or land vehicles such as cars, motorcycles, and/or trucks. The metal substrate also may be in the form of, for example, a sheet of metal or a fabricated part. It will also be understood that the substrate may be pretreated with a pretreatment solution including a zinc phosphate pretreatment solution such as, for example, those described in U.S. Pat. Nos. 4,793,867 and 5,588,989, or a zirconium containing pretreatment solution such as, for example, those described in U.S. Pat. Nos. 7,749,368 and 8,673,091. The substrate may comprise a composite material such as a plastic or a fiberglass composite. The substrate may be a fiberglass and/or carbon fiber composite. The compositions disclosed herein are particularly suitable for use in various automotive, aerospace, or industrial applications.

Whereas specific aspects of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

Aspects

In view of the foregoing the present invention thus relates inter alia, without being limited thereto, to the following aspects:

1. A composition comprising:
   an epoxy-containing compound;
   a polythiol curing agent; and
   a curing agent;
   wherein the equivalent ratio of epoxide groups to thiol groups is 50:1 to 1:50.
2. The composition of Aspect 1, wherein the equivalent ratio of epoxide groups to thiol groups is 25:1 to 1:28.
3. The composition of Aspect 1 or 2, wherein the epoxy-containing compound and/or the polythiol curing agent has an equivalent weight of at least 400 g/eq and/or wherein the epoxy-containing compound and/or the polythiol curing agent has an equivalent weight of less than 400 g/eq.
4. The composition of Aspect 3, wherein the epoxy-containing compound has an equivalent weight of at least 400 g/eq and the polythiol curing agent has an equivalent weight of less than 400 g/eq.
5. The composition of Aspect 3, wherein the polythiol curing agent has an equivalent weight of at least 400 g/eq and the epoxy compound has an equivalent weight of less than 400 g/eq.
6. The composition of Aspect 3, wherein the epoxy-containing compound and the polythiol curing agent have an equivalent weight of less than 400 g/eq.
7. The composition of any one of preceding Aspects 1, 2, 3 or 5, wherein the polythiol curing agent has an equivalent weight of at least 1000 g/eq.
8. The composition of any one of the preceding Aspects, wherein the epoxy-containing compound is present in an amount of 4 weight % to 85 weight % based on total weight of the composition.
9. The composition of any one of the preceding Aspects, wherein the polythiol curing agent is present in an amount of 4 weight % to 60 weight % based on total weight of the composition.
10. The composition of any one of the preceding Aspects, further comprising a second polythiol curing agent, such as a polythiol curing agent having at least three functional groups.
11. The composition of any one of the preceding Aspects, wherein the second curing agent is present in an amount of 0.01 weight % to 15 weight % based on total weight of the composition.
12. The composition of any one of the preceding Aspects, wherein the second curing agent comprises a blocked curing agent, an encapsulated curing agent, or combinations thereof.
13. The composition of any one of the preceding Aspects, wherein the second curing agent comprises a urea, an amine-epoxy adduct, or combinations thereof.
14. The composition of any one of the preceding Aspects, wherein the second curing agent comprises a heat-activated latent curing agent such as a secondary and/or a tertiary amine.
15. The composition of any one of the preceding Aspects, further comprising elastomeric particles, a filler material, a plasticizer, a reactive diluent, and/or an elastomer.
16. The composition of Aspect 15, wherein the elastomeric particles have a core-shell structure.
17. The composition of any one of the preceding Aspects, wherein the composition is substantially free of calcium oxide.
18. The composition of any one of the preceding Aspects, wherein the composition is workable at ambient conditions for at least 10 days and/or wherein the composition has a viscosity that does not double for at least 10 days after mixing as measured at 1,000 Pa shear stress using an Anton-Paar MCR 301 rheometer at ambient temperature using a 40 mm diameter parallel plate with a 0.5 mm gap in rotation mode.
19. The composition of any one of the preceding Aspects, wherein the composition comprises a sealant or a coating composition.
20. A method for treating a substrate comprising:
contacting at least a portion of a surface of the substrate with a composition according to any one of preceding Aspects 1 to 19.
21. The method of Aspect 20, further comprising exposing the treated substrate to a temperature of 130° C. or less, for example to a temperature of 90° C. or less.
22. A substrate comprising at least one surface at least partially coated with a layer formed from the composition according to any one of preceding Aspects 1 to 19, for example obtained according to the method according to any one of Aspects 20 or 21.
23. The substrate of Aspect 22, further comprising a film, a second layer, or a coating positioned between the substrate surface and the layer formed from the composition according to any one of preceding Aspects 1 to 19 and/or positioned over the layer formed from the composition according to any one of preceding Aspects 1 to 19.
24. The substrate of any one of Aspects 22 or 23, wherein the substrate:
(a) a sound damping loss factor of at least 0.02 at 200 Hz, 10° C., 2.5 mm sealant thickness measured according to SAE test method J1637 and ASTM E-756 on 240 mm long, 10 mm wide, and 1 mm thick steel panels coated along 215 mm of the length;
(b) a sound damping loss factor of at least 0.04 at 400 Hz, 10° C., 2.5 mm sealant thickness measured according to SAE test method J1637 and ASTM E-756 on 240 mm long, 10 mm wide, and 1 mm thick steel panels coated along 215 mm of the length;
(c) a sound damping loss factor of at least 0.06 at 800 Hz, 10° C., 2.5 mm sealant thickness measured according to SAE test method J1637 and ASTM E-756 on 240 mm long, 10 mm wide, and 1 mm thick steel panels coated along 215 mm of the length;
(d) a load at failure greater than 1 MPa measured according to ASTM D-412 with a pull rate of 50 mm/min and a sample dog bone configuration as shown in FIG. 1; and/or
(e) an elongation of at least 50% measured according to ASTM D-412 with a pull rate of 50 mm/min and a sample dog bone configuration as shown in FIG. 1.
25. The substrate of any one of Aspects 22 to 24 being a part of a vehicle.
26. A vehicle comprising the part of Aspect 25 and/or at least partially coated with the composition according to any one of preceding Aspects 1 to 19.
27. The vehicle of Aspect 26, wherein the vehicle is an automobile or an aircraft.
28. Use of a composition according to any one of preceding Aspects 1 to 19 as a sealant or for coating a vehicle or a part of a vehicle.

Illustrating the invention are the following examples, which, however, are not to be considered as limiting the invention to their details. Unless otherwise indicated, all parts and percentages in the following examples, as well as throughout the specification, are by weight.

Examples

In the Examples, the following instruments were used to monitor reaction progress: acid value titration (equipment, Metrohm 888 Titrando; reagent, 0.1 N KOH solution in methanol); epoxide equivalent titrate (equipment, Metrohn 888 Titrando; reagent, 0.1 N perchloric acid in glacial acetic acid).

Synthesis of Polycaprolactone Diol Modified Epoxy Resin 948 g of methylhexahydrophthalic anhydride ("MHHPA", commercially available from Dixie Chemical) and 4,054.7 g of Epon 828 (bisphenol A diglycidyl ether epoxy resin commercially available from Hexion Specialty Chemicals) were added to a 12-liter, 4-necked kettle equipped with a motor driven stainless steel stir blade, a water-cooled condenser, a nitrogen blanket, and a heating mantle with a thermometer connected through a temperature feedback control device. The contents of flask were heated to 90° C. and held for 30 minutes. 2,064.0 g of Capa 2077A (polycaprolactone-based diol commercially available from Perstorp Group) was added and the reaction mixture was held at 90° C. for 30 minutes. 395.9 g of Epon 828 and 46.4 g of triphenyl phosphine (available from Sigma Aldrich) were added and the mixture exothermed and was heated to 120° C. after exotherm. The reaction mixture was held at 120° C. until the acid value was less than 2 mg KOH/g by titration using a Metrohm 888 Titrando and 0.1 N KOH solution in Methanol as the titration reagent. The reaction temperature was cooled to 80° C. and the resin was poured out from the flask. The epoxide equivalent of this epoxy adduct was 424 g/epoxide as determined by titration using a Metrohm 888 Titrando and 0.1 N Perchloric acid in glacial acetic acid. The weight average molecular weight was 3,670 g/mol as determined by Gel Permeation Chromatography using a Waters 2695 separation module with a Waters 410 differential refractometer (RI detector) and polystyrene standards. Tetrahydrofuran (THF) was used as the eluent at a flow rate of 1 ml min$^{-1}$, and two PL Gel Mixed C columns were used for separation. The epoxy adduct prepared by this procedure is referred to as CAPA di-/MHHPA/Epon 828 in the following examples.

Ingredients for sealant compositions are provided in Tables 1-4. The sealant compositions described below were prepared according to the following procedure with all non-manual mixing performed using a Speedmixer DAC 600FVZ (commercially available from FlackTeck, inc.). The part A components included under "Resins", "Elastomers", and "Plasticizers" were combined and mixed for 15 seconds at 2,350 RPM. The ingredients listed as "Fillers", "Accelerators and catalysts", and "Additives" were then added and mixed for 30 seconds at 2,350 RPM. The mixture was examined with a spatula and given additional mix time, if necessary, to ensure uniformity. In a separate vessel, the part B components were mixed in the same fashion as part A. Parts A and B were combined in the ratios shown in the example table then mixed for 15 seconds at 2,350 RPM. Test specimens were prepared within five minutes of mixing.

Sealant formulations were drawn down with a 3 mm thick drawdown bar over a woven Teflon baking sheet secured to a steel 4"×12" panel. Compositions were baked at 80° C. for 30 minutes in an electric oven, regardless of 1K or 2K composition. Samples were allowed to cool and were kept under ambient conditions for at least seven days before die cutting into dog bones. Dog bones were die cut to the dimensions shown in FIG. 1. Dog bone samples were pulled on the Instron model 5567 at a pull rate of 50 mm/min and a clamp distance of 30 mm (clamps gripped 10 mm of the sample). Five dog bones were run for each sealant and the average of the five is reported. Elongation (%) and load at failure (MPa) were determined from the plot of tensile stress versus strain.

Oberst bars were tested according to SAE Test Method J1637 "Laboratory Measurement of the Composite Vibration Damping Properties of Materials on a Supporting Steel Bar" and ASTM Test Method E756 "Standard Test Method for Measuring Vibration-Damping Properties of Materials". The test was conducted in an environmental chamber from Applied Test Systems Chamber Model 3710 with temperature controller model 2010 HC; liquid nitrogen tank and appropriate connections and fittings were used for cooling from ambient temperature. Damping at 200 Hz, 400 Hz, and 800 Hz was interpolated from resonance frequencies between damping modes 1 and 2, 2 and 3, or 3 and 4 respectively.

TABLE 1

2K Sealant Compositions (ingredients in parts by weight)

| Composition # | 1 | 2 (Comparative) |
|---|---|---|
| Part A | | |
| Epoxy resins | | |
| CAPA di-/MHHPA/Epon 828 | 43.3 | — |
| Epotec YDPN 631 | — | 4.1 |
| Epon 828 | — | 4.1 |
| Plasticizers | | |
| Jayflex DINP | 5.0 | 2.0 |
| Curing Agents | | |
| Neostann U-220H | 0.2 | — |
| Fillers | | |
| Ultra Pflex | 16.6 | 7.4 |
| Part B | | |
| Thiol resins | | |
| Thiocure PETMP | 2.7 | — |
| Thiocure TMPMP | 8.4 | — |
| Permapol P-3.1e | — | 50.5 |
| Polythiol QE-340M | — | 2.0 |
| Elastomers | | |
| MS polymer SAX 750 | 9.7 | — |
| Plasticizers | | |
| Jayflex DINP | 2.0 | — |
| Curing Agents | | |
| DABCO 33-LV | 1.3 | 0.6 |
| Silquest A-1100 | — | 0.1 |
| Fillers | | |
| Ultra Pflex | 20.2 | 35.1 |
| Epoxy equivalent weight (g/eq, weighted average) | 423 | 180 |
| Thiol equivalent weight (g/eq, weighted average) | 132 | 1,580 |
| Load at failure (MPa) | 3.60 | 1.93 |
| Elongation (%) | 225 | 262 |

The data in Table 1 demonstrate that the load at failure for Composition 1 was improved over load at failure of comparative Composition 2, while maintaining elongation, while being made with a thiol having a thiol equivalent weight of less than 600 g/eq. This was a surprising and unexpected result.

TABLE 2

Sealant Compositions (ingredients in parts by weight)

| Composition # | 3 | 4 | 5 | 6 | 7 | 8 |
|---|---|---|---|---|---|---|
| Part A | | | | | | |
| Epoxy resins | | | | | | |
| CAPA di-/MHHPA/Epon 828 | 43.3 | 43.3 | 43.3 | 43.3 | 43.3 | 43.3 |

TABLE 2-continued

Sealant Compositions (ingredients in parts by weight)

| Composition # | 3 | 4 | 5 | 6 | 7 | 8 |
|---|---|---|---|---|---|---|
| Plasticizers | | | | | | |
| Jayflex DINP | 4.5 | 4.5 | 4.5 | 4.5 | 4.5 | 4.5 |
| Curing Agents | | | | | | |
| Neostann U-220H | — | — | 0.2 | 0.2 | 0.2 | 0.2 |
| Fillers | | | | | | |
| Ultra Pflex | 16.6 | 16.6 | 16.6 | 16.6 | 16.6 | 16.6 |
| Part B | | | | | | |
| Thiol resins | | | | | | |
| Thiocure PCL4MP[1] | 30.4 | — | 30.4 | 15.2 | — | — |
| Thiocure TMPMP | — | — | — | 5.7 | — | — |
| Thiocure PETMP | — | 10.7 | — | — | 10.7 | 10.7 |
| Elastomers | | | | | | |
| MS polymer SAX 750 | — | — | 11.6 | 10.7 | 9.7 | 19.3 |
| Plasticizers | | | | | | |
| Jayflex DINP | 2.0 | 2.0 | 2.0 | 2.0 | 2.0 | 2.0 |
| Curing Agents | | | | | | |
| DABCO 33-LV | 1.3 | 1.3 | 1.3 | 1.3 | 1.3 | 1.3 |
| Fillers | | | | | | |
| Ultra Pflex | 20.2 | 20.2 | 20.2 | 20.2 | 20.2 | 20.2 |
| Epoxy equivalent weight (g/eq, weighted average) | 423 | 423 | 423 | 423 | 423 | 423 |
| Mercaptan equivalent weight (g/eq, weighted average) | 353 | 125 | 353 | 293 | 125 | 125 |
| Load at failure (MPa) | 1.81 | 6.28 | 1.55 | 1.99 | 5.51 | 4.01 |
| Elongation (%) | 76% | 86% | 86% | 166% | 133% | 142% |

[1]Polycaprolactone Tetra (3-mercaptopropionate) available from Bruno Bock Thiochemicals These data demonstrate tensile performance in compositions containing a tetrafunctional polymer (PCL4MP, Compositions 3, 5, and 6), a tetrafunction small molecule (Compositions 4, 7, and 8), or a trifunctional small molecule (TMPMP, Composition 6) in the presence or absence of an STP elastomer.

TABLE 3

Sealant Compositions (ingredients in parts by weight)

| Composition # | 9 | 10 | 11 | 12 | 13 | 14 |
|---|---|---|---|---|---|---|
| Part A | | | | | | |
| Epoxy resins | | | | | | |
| CAPA di-/MHHPA/Epon 828 | 43.3 | 43.3 | 43.3 | 43.3 | 43.3 | 43.3 |
| Plasticizers | | | | | | |
| Jayflex DINP | 5.0 | 5.0 | 5.0 | 5.0 | 5.0 | 5.0 |
| Curing Agents | | | | | | |
| Neostann U-220H | 0.2 | 0.2 | 0.2 | 0.2 | 0.2 | 0.2 |
| Fillers | | | | | | |
| Ultra Pflex | 16.6 | 16.6 | 16.6 | 16.6 | 16.6 | 16.6 |
| Part B | | | | | | |
| Thiol resins | | | | | | |
| Thiocure TMPMP | — | 2.8 | 5.6 | 8.4 | 2.8 | 2.8 |
| Thiocure PETMP | 10.7 | 8.0 | 5.4 | 2.7 | 8.0 | 8.0 |
| Elastomers | | | | | | |
| MS polymer SAX 750 | 9.7 | 9.7 | 9.7 | 9.7 | — | — |
| MS polymer SAX 400[1] | — | — | — | — | 9.7 | — |
| MS polymer SAX 350[2] | — | — | — | — | — | 9.7 |
| Plasticizers | | | | | | |
| Jayflex DINP | 2.0 | 2.0 | 2.0 | 2.0 | 2.0 | 2.0 |

TABLE 3-continued

Sealant Compositions (ingredients in parts by weight)

| Composition # | 9 | 10 | 11 | 12 | 13 | 14 |
|---|---|---|---|---|---|---|
| Curing Agents | | | | | | |
| DABCO 33-LV | 1.3 | 1.3 | 1.3 | 1.3 | 1.3 | 1.3 |
| Fillers | | | | | | |
| Ultra Pflex | 20.2 | 20.2 | 20.2 | 20.2 | 20.2 | 20.2 |
| Epoxy equivalent weight (g/eq, weighted average) | 423 | 423 | 423 | 423 | 423 | 423 |
| Mercaptan equivalent weight (g/eq, weighted average) | 127 | 129 | 131 | 127 | 127 | 127 |
| Load at failure (MPa) | 5.47 | 5.15 | 4.34 | 3.60 | 4.87 | 3.81 |
| Elongation (%) | 136% | 172% | 194% | 225% | 168% | 159% |

[1] Silyl-terminated polyether available from Kaneka
[2] Silyl-terminated polyether available from Kaneka The data in Table 3 demonstrate that the impact of the equivalent weights on performance.

Sound damping performance was measured using an Oberst test method. Sealants were applied by 3D printing uncoated steel bars (240 mm long, 10 mm wide, and 1 mm thick) along 215 mm of the length, leaving a root of bare steel 25 mm at the top of the bar, and across the entire 10 mm width. The sealants were applied at a target thickness of 2.5 mm. The mass of the bars varied with sealant density but was approximately 4 kg/m². Two bars were prepared for each sealant and the average of the two is reported. Following additive manufacturing of the sound damping test specimen, the specimen were conditioned at ambient conditions for 3-5 days followed by 1 day at 140° F. (60° C.). Composition 15 was compared to a commercial aerospace sealant, PR-2001 B4 Class B Rapid Curing Fuel Tank Sealant prepared according to manufacturer's instructions.

Formulations were printed using a custom-built 3D printer comprised of a LuzBot Taz 5 gantry and print bed integrated with a ViscoTec Eco-Duo dual extruder. The sealant formulations, comprised of an A and B pack, where the A pack is an epoxy formulation and the B pack is a thiol formulation, were loaded into 20 fl oz Nordson Optimum cartridges, which were connected to the ViscoTec Eco-Duo dual extruder using PTFE tubing. The Nordson cartridges were pressurized to 80 Psi to provide a continuous feed of A and B components to the dual extruder. The A and B components were mixed during extrusion using MKH 03-16S static mixing nozzles, which were attached directly to the orifice of the ViscoTec extruder.

Sealants were 3D printed as into 215 mm×10 mm×3 mm geometries directly on top of 240 mm×10 mm×1 mm metal bars. The metal bars were held in a fixed position using a magnetic plate placed directly on top of the print bed. Using Simplify3D Software, a 215 mm×10 mm×3 mm .stl model was sliced as a single perimeter with a 45 degree infill pattern containing a 0.85 mm nominal bead width and 1 mm nominal bead height. The sealants were 3D printed at a constant flow rate of 1 ml/minute, set by the control unit of the ViscoTec extruder, with a constant print head speed of 850 mm/minute. The control sample sealant (PR-2001 B4 Class B Rapid Curing Fuel Tank Sealant) was printed using a B:A volumetric flow ratio of 5.9:1, and the thiol-epoxy formulation was printed at a A:B volumetric ratio of 2:1.

Figure 2:
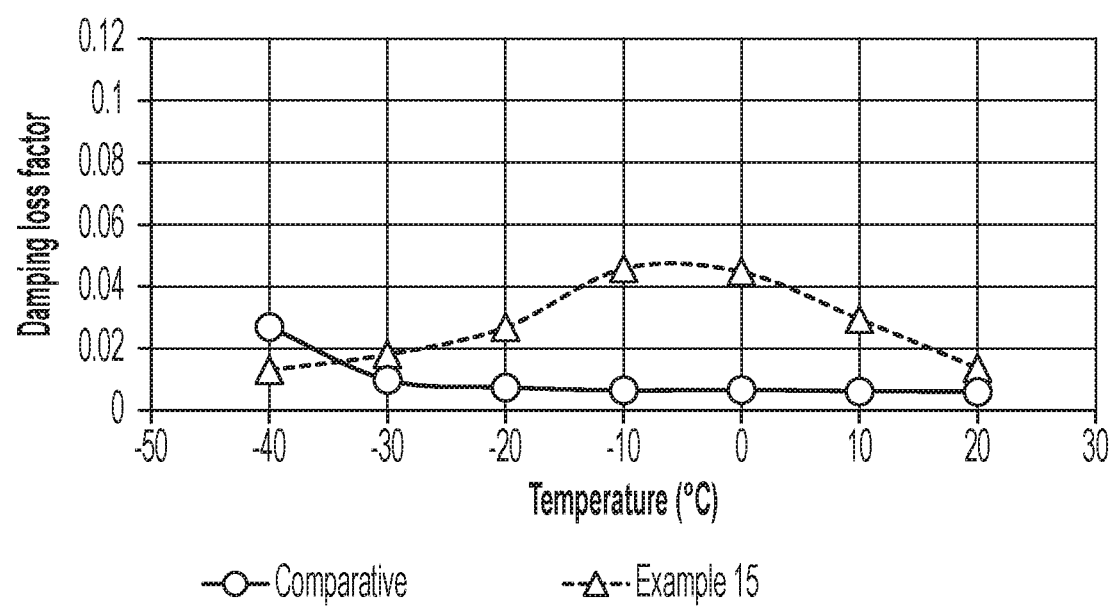
FIG. 2 shows the sound damping performance achieved with Composition 15 at a loss factor of 200 Hz (4 kg/m2).
Figure 3:
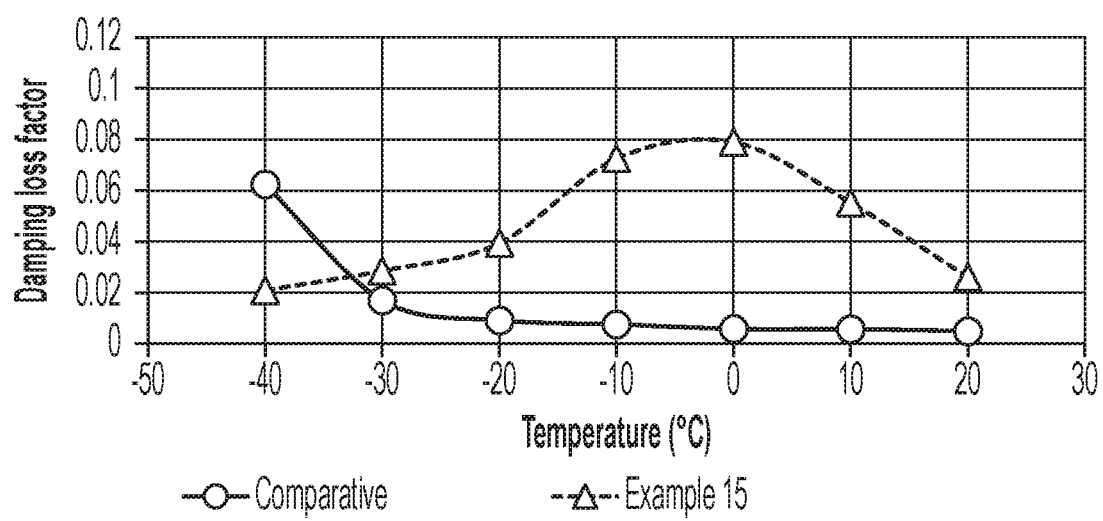
FIG. 3 shows the sound damping performance achieved with Composition 15 at a loss factor of 400 Hz (4 kg/m2).
Figure 4:
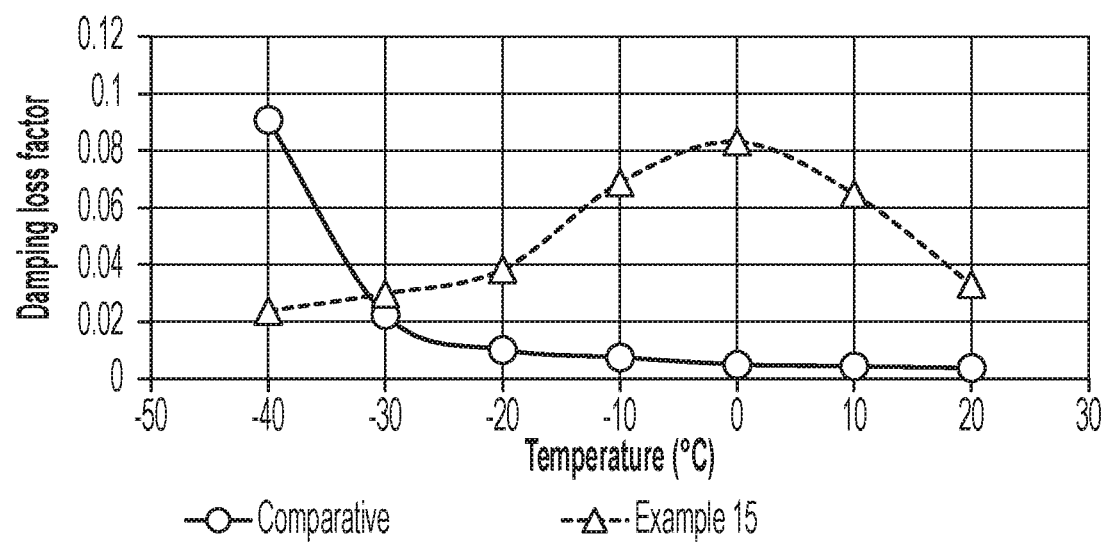
FIG. 4 shows the sound damping performance achieved with Composition 15 at a loss factor of 800 Hz (4 kg/m2).

Oberst bars were tested as described above. Data are shown in FIGS. 2-4.

TABLE 4

Sealant Composition for 3D Printing

| Composition | 15 |
|---|---|
| Part A | |
| Epoxy resins | |
| CAPA di-/MHHPA/Epon 828 | 39.0 |
| Erisys GE-21[1] | 1.3 |
| Plasticizers | |
| Jayflex DINP | 5.0 |
| Curing Agents | |
| Neostann U-220H | 0.2 |
| Fillers | |
| Ultra Pflex | 4.5 |
| Aerosil R202[2] | 2.1 |
| Part B | |
| Thiol resins | |
| Thiocure PETMP | 2.7 |
| Thiocure TMPMP | 8.4 |
| Elastomers | |
| MS polymer SAX 750 | 9.7 |
| Curing Agents | |
| DABCO 33-LV | 1.3 |
| Fillers | |
| Albacar HO[3] | 9.6 |
| Part A density (g/mL) | 8.5 |
| Part B density (g/mL) | 11.0 |
| Mix ratio part A:part B (by weight) | 1.6:1.0 |
| Mix ratio part A:part B (by volume) | 2:1 |
| Epoxy equivalent weight (g/eq, weighted average) | 413 |
| Mercaptan equivalent weight (g/eq, weighted average) | 132 |
| Part A Viscosity (mPa * s) at 100 Pa shear stress | 1.98E+06 |
| Part A Viscosity (mPa * s) at 1,000 Pa shear stress | 1.10E+05 |
| Part B Viscosity (mPa * s) at 100 Pa shear stress | 1.88E+06 |
| Part B Viscosity (mPa * s) at 1,000 Pa shear stress | 2.96E+04 |
| Loss factor (unitless) at 200 Hz, 10° C. | 0.030 |
| Loss factor (unitless) at 400 Hz, 10° C. | 0.055 |
| Loss factor (unitless) at 800 Hz, 10° C. | 0.065 |
| Load at failure (MPa) | 2.7 |
| Elongation (%) | 139 |

[1] 1,4-butanediol diglycidyl ether available from CVC Thermoset Specialties
[2] Hydrophobic fumed silica available from Evonik
[3] Precipitated calcium carbonate available from Minerals Tech

We claim:
1. A composition comprising:
a polythiol curing agent;
a first component comprising an epoxy-containing compound; and
a second component comprising a second curing agent that reacts with the polythiol curing agent in the absence of an external energy source;
wherein the polythiol curing agent may be in the first component and/or the second component;
wherein the epoxy-containing compound has an epoxide equivalent weight of more than 400 g/eq and the polythiol curing agent has a polythiol equivalent weight of no more than 600 g/eq or the epoxy-containing compound has an epoxide equivalent weight of no more than 400 g/eq and the polythiol curing agent has a polythiol equivalent weight of more than 600 g/eq; and
wherein the theoretical maximum crosslink density (XLD) of the epoxy-containing compound and the polythiol curing agent is at least 0.9 mol/kg and no more than 4 mol/kg, calculated according to formula:

$$XLD = \sum_{i=A}^{N} \frac{X_i}{2EW'_i}$$

wherein XLD is the theoretical crosslink density, $X_i$ is the weight fraction of polymer I, EW' is the adjusted equivalent weight calculated according to the equation:

$$\frac{1}{EW'_i} = \frac{1}{EW_i} - \frac{2}{Mw_i},$$

where EW is the functional group equivalent weight, and Mw is the weight average molecular weight.

2. The composition of claim 1, wherein an equivalent ratio of epoxide groups to thiol groups is 10:1 to 1:30.

3. The composition of claim 1, wherein the polythiol curing agent is present in an amount of 5 weight percent to 60 weight percent based on total weight of the composition.

4. The composition of claim 1, further comprising a second polythiol curing agent.

5. The composition of claim 4, wherein the second polythiol curing agent comprises at least three functional groups.

6. The composition of claim 1, further comprising elastomeric particles.

7. The composition of claim 1, further comprising a filler material, a plasticizer, a reactive diluent, and/or an elastomer.

8. The composition of claim 1, wherein the composition comprises a sealant.

9. A method for treating a substrate comprising:
contacting a surface of the substrate with the composition of claim 1.

10. The method of claim 9, further comprising exposing the treated substrate to a temperature of 90° C. or less.

11. A substrate comprising a surface at least partially coated with a layer formed rom the composition of claim 1.

12. The substrate of claim 11, wherein the substrate has:
(a) a sound damping loss factor of at least 0.02 at 200 Hz, 10° C., 2.5 mm sealant thickness measured according to SAE test method J1637 and ASTM E-756 on 240 mm long, 10 mm wide, and 1 mm thick steel panels coated along 215 mm of the length;
(b) a sound damping loss factor of at least 0.04 at 400 Hz, 10° C., 2.5 mm sealant thickness measured according to SAE test method J1637 and ASTM E-756 on 240 mm long, 10 mm wide, and 1 mm thick steel panels coated along 215 mm of the length;
(c) a sound damping loss factor of at least 0.06 at 800 Hz, 10° C., 2.5 mm sealant thickness measured according to SAE test method J1637 and ASTM E-756 on 240 mm long, 10 mm wide, and 1 mm thick steel panels coated along 215 mm of the length;
(d) a load at failure greater than 1 MPa measured according to ASTM D-412 with a pull rate of 50 mm/min and a sample dog bone configuration; and/or
(e) an elongation of at least 50% measured according to ASTM D-412 with a pull rate of 50 mm/min and a sample dog bone configuration.

13. A part comprising the substrate of claim 11.

14. The part of claim 13, wherein the part comprises a three-dimensional part.

15. A vehicle comprising the substrate of claim 11.

16. The vehicle of claim 15, wherein the vehicle is an automobile or an aircraft.

17. A method of forming an article comprising extruding the composition of claim 1.

18. The method of claim 17, wherein the extruding comprising three-dimensional printing.

19. The method of claim 17, wherein the forming comprising applying successive layers to build the article.

20. An article formed by the method of claim 17.

21. The article of claim 20, wherein the article comprises a sound damping pad.

* * * * *